United States Patent
Gavens

(10) Patent No.: US 9,323,662 B2
(45) Date of Patent: Apr. 26, 2016

(54) FLASH MEMORY USING VIRTUAL PHYSICAL ADDRESSES

(71) Applicant: Lee M. Gavens, Milpitas, CA (US)

(72) Inventor: Lee M. Gavens, Milpitas, CA (US)

(73) Assignee: SanDisk Technologies, Inc., Plano, TX (US)

( * ) Notice: Subject to any disclaimer, the term of this patent is extended or adjusted under 35 U.S.C. 154(b) by 81 days.

(21) Appl. No.: 13/793,581

(22) Filed: Mar. 11, 2013

(65) Prior Publication Data

US 2014/0189200 A1    Jul. 3, 2014

Related U.S. Application Data

(60) Provisional application No. 61/747,445, filed on Dec. 31, 2012.

(51) Int. Cl.
| | | |
|---|---|---|
| *G06F 12/00* | (2006.01) | |
| *G06F 12/02* | (2006.01) | |
| *G06F 12/10* | (2006.01) | |
| *G06F 12/06* | (2006.01) | |

(52) U.S. Cl.
CPC ........ *G06F 12/0246* (2013.01); *G06F 12/0238* (2013.01); *G06F 12/0607* (2013.01); *G06F 12/10* (2013.01); *G06F 2212/7201* (2013.01); *G06F 2212/7208* (2013.01)

(58) Field of Classification Search
CPC ............ G06F 12/0238; G06F 12/0246; G06F 12/0607; G06F 12/10
See application file for complete search history.

(56) References Cited

U.S. PATENT DOCUMENTS

| | | | |
|---|---|---|---|
| 5,293,607 A | 3/1994 | Brockmann et al. | |
| 6,772,274 B1 | 8/2004 | Estakhri | |
| 6,978,342 B1 | 12/2005 | Estakhri et al. | |
| 2003/0037185 A1 | 2/2003 | Davis et al. | |
| 2004/0073743 A1 | 4/2004 | Arimilli et al. | |
| 2006/0026341 A1 | 2/2006 | Lasser | |
| 2008/0307192 A1* | 12/2008 | Sinclair | G06F 12/0246 711/218 |
| 2009/0248950 A1* | 10/2009 | Tamaki et al. | 711/6 |
| 2011/0010483 A1* | 1/2011 | Liljeberg | G06F 12/1441 711/6 |
| 2011/0213921 A1 | 9/2011 | Yu et al. | |
| 2012/0311237 A1* | 12/2012 | Park | 711/103 |

FOREIGN PATENT DOCUMENTS

CN           101645042 A       2/2010

OTHER PUBLICATIONS

International Search Report and Written Opinion for corresponding PCT Application No. PCT/US2013/076973 dated Jul. 3, 2014.

* cited by examiner

*Primary Examiner* — Aracelis Ruiz
(74) *Attorney, Agent, or Firm* — Brinks Gilson & Lione

(57) ABSTRACT

A system and method for using virtual physical addresses in a non-volatile memory device are disclosed. The physical layout of the non-volatile memory device may have physical die that are not a power-of-2 in number. In order to advantageously use the power-of-2 die number, which enables using a power-of-2 die interleave, a virtual physical addressing scheme is used. In particular, the virtual physical addressing scheme includes virtual die and virtual blocks, wherein the virtual die are a power-of-2 in number. Further, a conversion between the virtual physical addressing scheme and the actual physical addressing scheme is provided. In this way, for certain operations of the memory device, the virtual addressing scheme is used. For other operations, such as reading from, writing to or erasing, the actual physical addressing scheme is used.

24 Claims, 14 Drawing Sheets

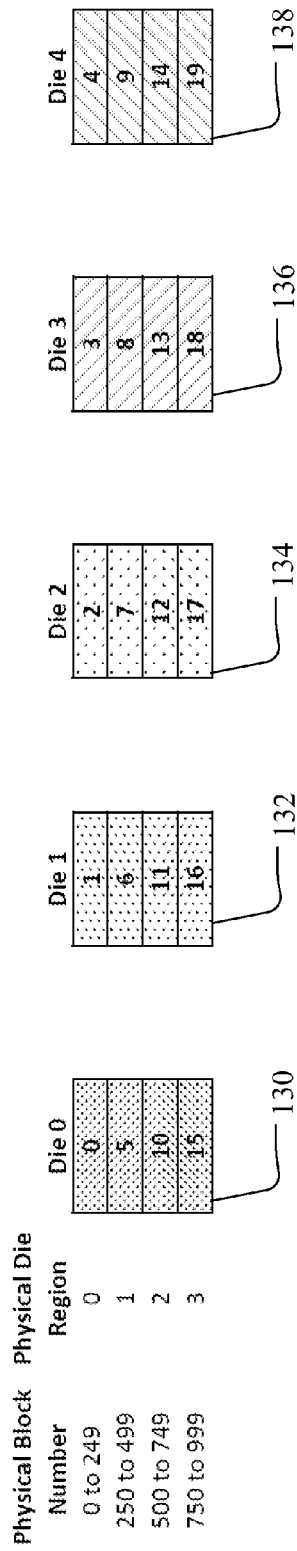

FIG. 9C
Virtual Die – Example 2
MetaPlane 0
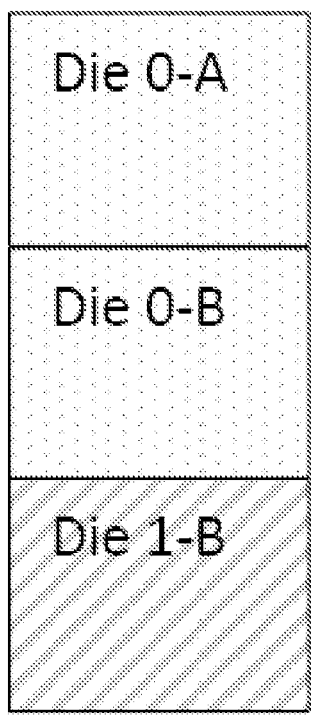
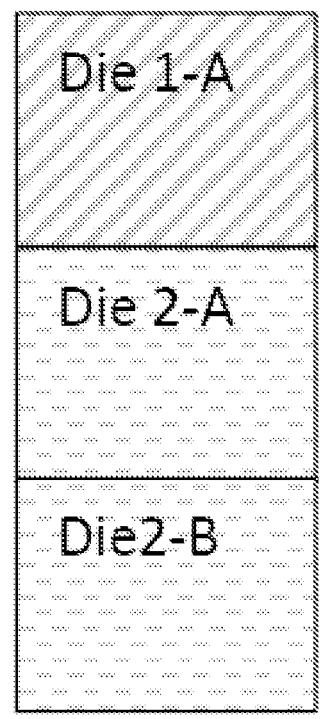

FIG. 9D

Virtual Die – Example 3

MetaPlane 0

Die 0-A     Die 1-A

MetaPlane 1

Die 0-B     Die 2-A

MetaPlane 2

Die 1-B     Die 2-B

FLASH MEMORY USING VIRTUAL PHYSICAL ADDRESSES

REFERENCE TO RELATED APPLICATION

This application claims the benefit of U.S. Provisional Application No. 61/747,445, filed on Dec. 31, 2012, which is hereby incorporated by reference herein in its entirety.

TECHNICAL FIELD

This application relates generally to managing data in a memory system. More specifically, this application relates to using virtual physical addresses in managing data in the memory system.

BACKGROUND

When writing data to a conventional flash data memory system, logical addresses are assigned to sectors, clusters or other units of data within a continuous virtual address space of the memory system. The system controller of the memory system then commonly maps data between the logical address space and the physical blocks of the memory, and then accesses one or more flash memory chips using the physical blocks.

Typically, the physical blocks of the memory are arranged on a power-of-2 number of die (such as 2 die, 4 die, 8, die, etc.). The power-of-2 die number enables using a power-of-2 die interleave, thereby simplifying the arithmetic and algorithms throughout the firmware of the memory system. For example, with a power-of-2 number of die, the arithmetic operations simplify to shifts and masks rather than to multiply, divide and modulo.

BRIEF SUMMARY

A non-volatile memory system and a method for operating the non-volatile memory system are provided. In one aspect, the method includes: receiving a logical address from a host device; converting between the logical address and a virtual physical address; and converting between the virtual physical address and an actual physical address. The conversion between the logical address from the host device (which may be a range of logical block addresses) and the virtual physical address may be one conversion between the logical address from the host device and a logical address internal to the non-volatile memory system, and another conversion between the logical address internal to the non-volatile memory system and the virtual physical address. Alternatively, the conversion between the logical address from the host device and virtual physical address may be a single conversion between the logical address from the host device and the virtual physical address.

The virtual physical addresses may comprise virtual die and virtual blocks, and the actual physical addresses comprise actual die and actual blocks. The number of virtual die may be a power-of-2 (such as 2, 4, 8, 16, etc.) and the number of the actual die may not be a power-of-2. Further the number of the virtual blocks per virtual die are different from the number of the actual blocks per actual die. For example, the number of virtual die may be less than the number of actual die, and the number of the virtual blocks per virtual die may be greater than the number of the actual blocks per actual die. So that, in one embodiment, the total number of actual blocks, which equals the number of actual die multiplied by the number of actual blocks per actual die, and the total number of virtual blocks, which equals the number of virtual die multiplied by the number of virtual blocks per virtual die, are equal.

The method may use the virtual physical addresses for certain operations, and may use the actual physical addresses for other operations. For example, a non-volatile memory system having a memory comprising a plurality of memory cells, the operations that use the actual physical addresses include operations on the memory cells, such as commanding to read a particular address, commanding to write to the particular address and commanding to erase a particular block.

In another aspect, a non-volatile memory system is provided. The non-volatile memory system includes: an interface configured to receive a logical address from a host device; a non-volatile memory; and a controller in communication with the memory and the interface. The controller is configured to: convert between the logical address and a virtual physical address; and convert between the virtual physical address and an actual physical address.

The conversion that the controller performs between the logical address from the host device (which may be a range of logical block addresses) and the virtual physical address may be one conversion between the logical address from the host device and a logical address internal to the non-volatile memory system, and another conversion between the logical address internal to the non-volatile memory system and the virtual physical address. Alternatively, the conversion that the controller performs between the logical address from the host device and virtual physical address may be a single conversion between the logical address from the host device and the virtual physical address.

The non-volatile memory system may use the virtual physical addresses for certain operations, and may use the actual physical addresses for other operations. For example, a non-volatile memory system having a memory comprising a plurality of memory cells, the operations that the non-volatile memory system uses the actual physical addresses include operations on the memory cells, such as commanding to read a particular address, commanding to write to the particular address and commanding to erase a particular block.

In still another aspect, a method and system for configuring virtual physical addressing in a non-volatile memory system is disclosed. The method includes: determining an actual physical configuration for the memory system comprising a number of actual die, the number of actual die being other than a power-of-2; determining a virtual physical configuration for the memory system comprising a number of virtual die, the number of virtual die being a power-of-2; and mapping the actual physical configuration with the virtual physical configuration. In one example, the number of virtual die is less than the number of actual die. The actual physical configuration may comprise a total number of actual blocks, with the total number of actual blocks equaling the number of actual die multiplied by a number of actual blocks per actual die. The virtual physical configuration may comprise a total number of virtual blocks, with the total number of virtual blocks equaling the number of virtual die multiplied by a number of virtual blocks per virtual die. In one embodiment, the total number of actual blocks equals the total number of virtual blocks. Further, the mapping may comprise mapping the actual physical die and actual physical blocks into one or more virtual metaplanes.

In yet another aspect, a system for configuring virtual physical addressing in a non-volatile memory system is provided. The system is configured to: determine an actual physical configuration for the memory system comprising a number of actual die, the number of actual die being other than a power-of-2; determine a virtual physical configuration for the memory system comprising a number of virtual die, the number of virtual die being a power-of-2; and map the actual physical configuration with the virtual physical configuration.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

FIGS. 8A-B illustrates one example of the mapping of sequential die regions in the physical space and in the virtual space.

FIGS. 9A-D illustrates other examples of the mapping of sequential die regions in the physical space and in the virtual space.

DETAILED DESCRIPTION

Figure 1:
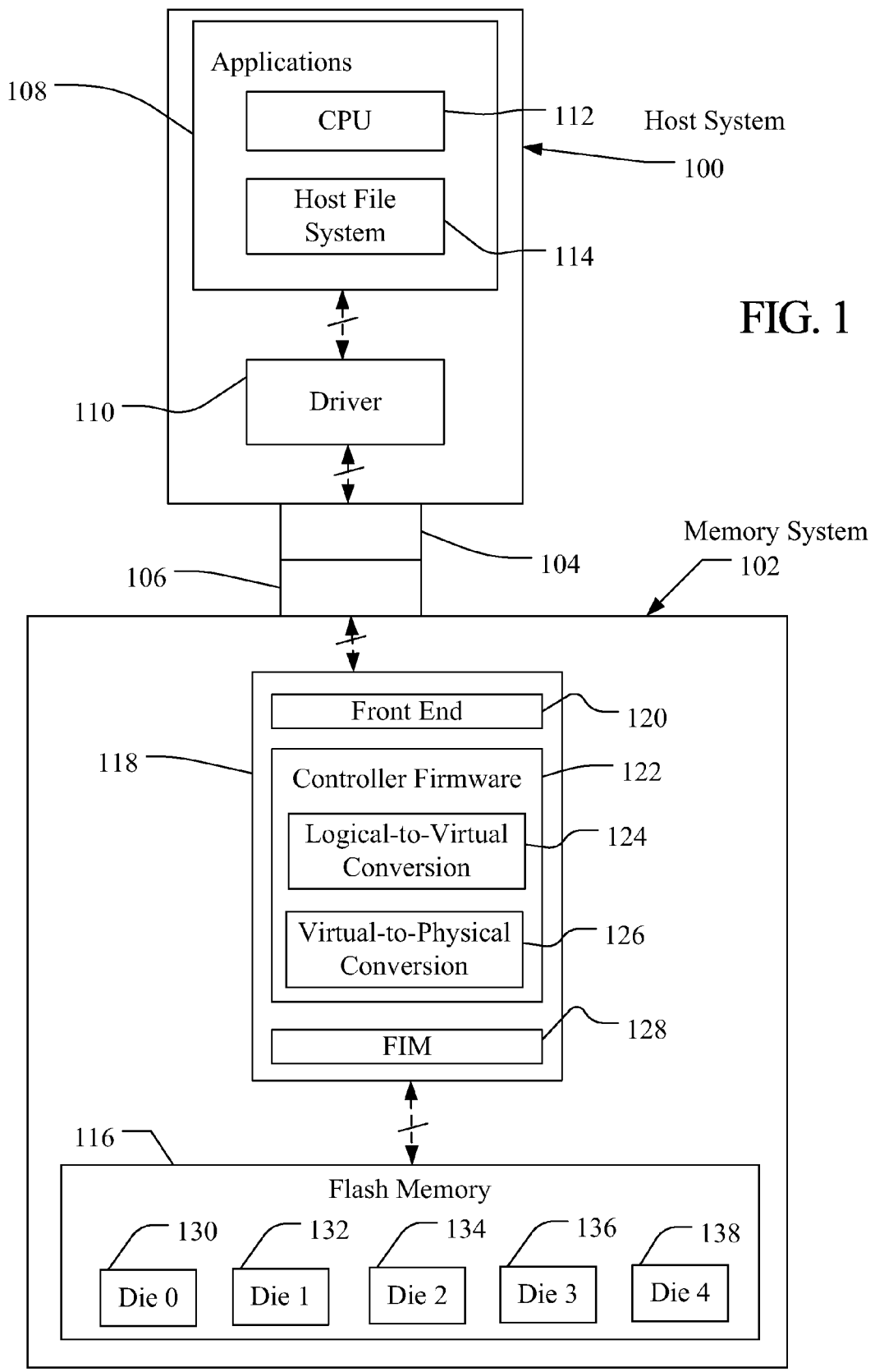
FIG. 1 illustrates a host connected with a memory system having a multi-bank non-volatile memory containing multiple die.

A flash memory system suitable for use in implementing aspects of the invention is shown in FIGS. 1-6. A host system 100 of FIG. 1 stores data into and retrieves data from a memory system 102. The memory system 102 may be flash memory embedded within the host, such as in the form of a solid state disk (SSD) drive installed in a personal computer. Alternatively, the memory system 102 may be in the form of a card that is removably connected to the host system 100 through mating parts 104 and 106 of a mechanical and electrical connector as illustrated in FIG. 1. A flash memory configured for use as an internal or embedded SSD drive may look similar to the schematic of FIG. 1, with the primary difference being the location of the memory system 102 internal to the host system 100. SSD drives may be in the form of discrete modules that are drop-in replacements for rotating magnetic disk drives.

The host system 100 of FIG. 1 may be viewed as having two major parts, insofar as the memory system 102 is concerned, made up of a combination of circuitry and software. They are an applications portion 108 and a driver portion 110 that interfaces with the memory system 102. In a PC, for example, the applications portion 110 can include a processor 112 running word processing, graphics, control or other popular application software, as well as the file system 114 for managing data on the host system 100. In a camera, cellular telephone or other host system that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as flash memory 116, and a system controller 118 that both interfaces with the host system 100 to which the memory system 102 is connected for passing data back and forth and controls the flash memory 116.

When communicating with the memory system, the host system 100 may send logical addresses of data, such as in the form of a range of logical block addresses (LBAs). The system controller 118 may then convert the LBAs, in one or more steps, to the actual physical addresses on the flash memory 116. Typically, the system controller performs a logical address-to-actual physical address conversion in order to map to the actual physical addresses. For example, the LBAs from the host system 100 may be mapped to memory system internal logical addresses, and the memory system internal logical addresses are mapped to the actual physical addresses. As another example, the LBAs from the host system 100 may be mapped directly to the actual physical addresses.

As discussed in more detail below, the physical addresses in the flash memory 116 may be represented in one of several ways, including actual physical addresses and/or virtual physical addresses. So that, in one embodiment, logical addresses (such as the LBAs or the memory system internal logical addresses) are mapped to virtual physical addresses (such as by using logical-to-virtual conversion logic 124). In one embodiment, the LBAs may first be mapped to the memory system internal logical addresses, and the memory system internal logical addresses to the virtual physical addresses. In an alternate embodiment, the LBAs may be mapped directly to the virtual physical addresses. Further, the virtual physical addresses may be mapped to the actual physical addresses (such as by using virtual-to-physical conversion logic 126).

More specifically, the physical addresses (such as the physical die) may be characterized in multiple ways. For example, the physical addresses may be represented by an actual physical implementation (such as actual physical die and actual physical blocks) and/or a virtual physical implementation (such as virtual physical die and virtual physical blocks). As discussed in more detail below, in the event that the number of actual physical die is not a power-of-2, it may be advantageous to use a virtual physical characterization, where the number of virtual physical die is a power-of-2 in number.

FIG. 1 illustrates that the flash memory 116 includes five memory die 130, 132, 134, 136, 138. Typically, the number of memory die is a power-of-2, such as 2, 4, 8, 16, etc. Unlike the typical arrangement, in one embodiment, the number of memory die is a non-power-of-two, such as three, five, seven, nine, ten, etc.

The typical power-of-2 NAND die arrangement enables various benefits, such as, for example, using a power-of-2 die interleave. For example, the arithmetic and overhead of supporting die interleaving is simplified if the die interleaving is done with a power-of-2 number of die, such as 2 or 4 die.

More specifically, with a power-of-2 number of die, the arithmetic operations simplify to shifts and masks rather than to multiply, divide, and modulo. So that, limiting the number of die to powers of 2 helps simplify the arithmetic and algorithms throughout the firmware of the memory system 102.

There are instances, however, where it is desirable to have the flexibility to select the number of die that is not a power-of-2 in number. Various reasons include for example: end user storage capacity; mix of single level cell (SLC) and multi-level cell (MLC) blocks; mix of host and system blocks; and budget for bad blocks and spare blocks. In those instances where non-power-of-2 number of die is sought, the arithmetic and algorithmic benefits of power-of-2 die interleave are ordinarily unable to be used.

To be able to select non-power-of-2 number of die and also to be able to use the arithmetic and algorithmic benefits of power-of-2 die interleave, a mapping or conversion is performed between the non-power-of-2 physical die to a power-of-2 virtual die. A physical-to-virtual die translation may be performed so that certain operations of the system controller 118 are performed using the virtual physical die designations (which conform to the power-of-2 die number) and other operations of the system controller 118 (such as accesses to the NAND memory cells of the physical die) are performed using the actual physical die designations. In this way, the system controller 118 may still obtain the performance benefit of die interleaving with a non-power-of-2 number of actual physical die on the product. Further, memory devices with the non-power-of-2 number of die may use firmware from legacy power-of-2 die interleaving firmware with less effort to modify the legacy firmware and support software.

The system controller 118 may perform a variety of functions. FIG. 1 illustrates the various functions of the system controller 118, including a front end 120 that interfaces with the host system 100, controller firmware logic 122 for coordinating operation of the flash memory 116 and for internal memory management operations, and one or more flash interface modules (FIMs) 128 to provide a communication interface between the system controller 118 with the flash memory 116. The functions of the system controller 118 as depicted in FIG. 1 are merely for illustration purposes.

For example, the controller firmware block 122 may perform a multitude of operations, such as managing host communications, mapping host requests to NAND addresses, executing NAND operations, reporting completion status to host, etc. The functions may be segmented in a variety of ways, such as upper layers of firmware (which do not use physical addresses) and lower layers firmware (which use physical addresses). Examples of upper layers of firmware include, but are not limited to, memory management layer (MML), BLM (Block Link Manager), LLS (Low Level Sequencer), and some FCL (Flash Control Layer). Examples of lower layers of firmware include, but are not limited to, FPS (Flash Protocol Sequencer) and some FCL.

Certain operations (such as lower layers of firmware) may use the actual physical die. Whereas, other firmware operations (such as upper layers of firmware) may use the virtual physical die, which is a power-of-2 in die number. Examples of firmware operations which may use the actual physical die include, but are not limited to: setting NAND operating parameters; commanding the NAND to read a particular address; commanding the NAND to write a particular address; and commanding the NAND to erase a particular block. Examples of firmware operations which may use the virtual physical die include, but are not limited to: selecting the next internal logical address to write in-coming data at; identifying the internal logical address that holds data requested by the host; garbage collection operations, such as consolidating the valid data from several internal logical addresses into one internal logical address. For example, at the lowest implementation step in the Flash Control Layer, these higher level operations involving the virtual physical address will be converted to actual physical addresses. In this way, a virtual physical addressing scheme is used in order to advantageously use the power-of-2 die number, which enables using a power-of-2 die interleave. In particular, for certain operations of the memory device, the virtual addressing scheme is used. For other operations, such as reading from, writing to or erasing, the actual physical addressing scheme is used.

As discussed above, there may be several layers of mapping in the memory system 102. The memory system 102 receives LBAs from the host system 100. The memory system 102 converts between a logical address and a virtual physical address. In one embodiment, the memory system performs a logical-to-logical conversion (between the LBAs of the host system 100 and a memory system internal logical address), and then performs a logical-to-virtual physical conversion (between the memory system internal logical address and the virtual physical address). In an alternate embodiment, the memory system performs a single logical-to-virtual physical conversion (between the LBAs of the host system 100 to the virtual physical address). The memory system 102 may further convert between the virtual physical address and the actual physical address.

The memory system 102 may perform the conversions using various conversion logic, such as logical-to-virtual conversion logic 124 (which converts between a logical address (e.g., a memory system internal logical address) and a virtual physical address) and virtual-to-physical conversion logic 126 (which converts between a virtual physical address (virtual die/virtual block number) and an actual physical address (e.g., physical die/physical block number)). More specifically, the virtual-to-physical conversion logic 126 may use one or more mapping schemes in order to convert between virtual physical addresses (e.g., virtual physical die/physical virtual block) and the actual physical addresses (e.g., actual physical die/actual physical block), as discussed in more detail below.

Figure 2:
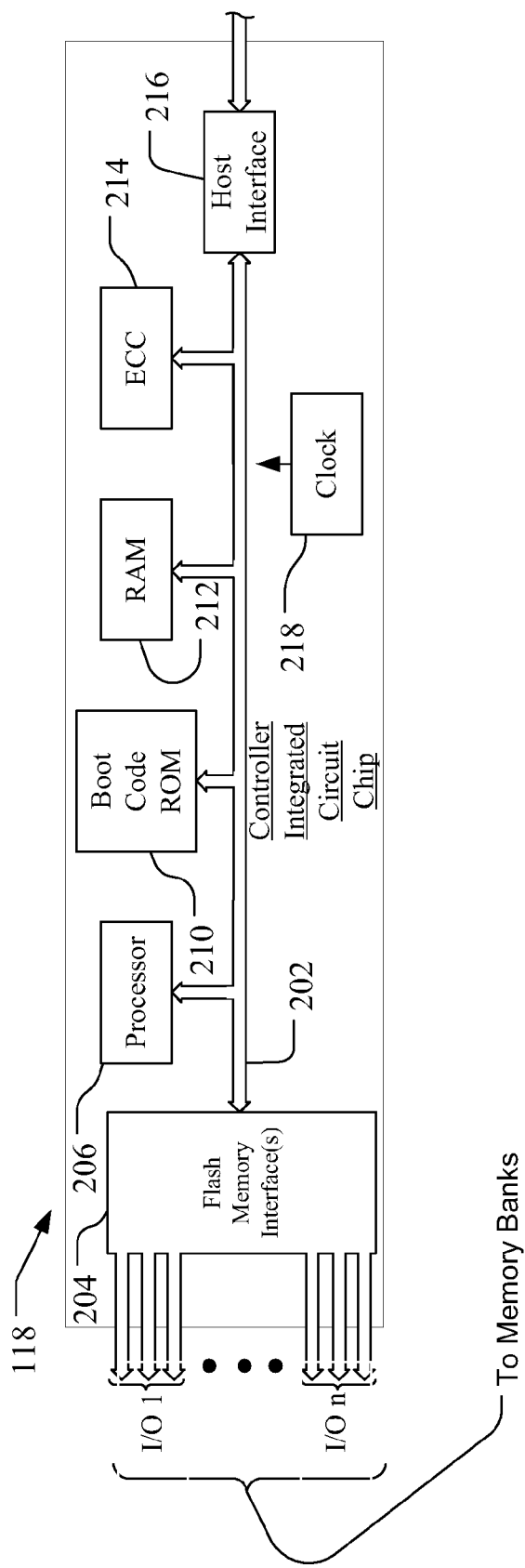
FIG. 2 is an example block diagram of an example flash memory system controller for use in the multiple die non-volatile memory of FIG. 1.

The system controller 118 may be implemented on a single integrated circuit chip, such as an application specific integrated circuit (ASIC), as shown in FIG. 2. Further, the various functions performed by the system controller 118 may be performed by a single device, or may be performed by multiple devices, such as shown in FIG. 2. More specifically, the system controller 118 may be segmented into the different devices illustrated in FIG. 2, such as flash memory interface(s) 204, processor 206, RAM 212, ECC 214, host interface 216, and clock 218. FIG. 2 is merely for illustration purposes.

The processor 206 of the system controller 118 may be configured as a multi-thread processor capable of communicating separately with each of the respective memory die 130, 132, 134, 136, 138 via one or more flash memory interface(s) 204.

The flash memory interface(s) 204 may have I/O ports for each of the respective die 130, 132, 134, 136, 138 in the flash memory 116. The system controller 118 may include an internal clock 218. The processor 206 may communicate with an error correction code (ECC) module 214, a RAM buffer 212, a host interface 216, and boot code ROM 210 via an internal data bus 202.

Figure 3:
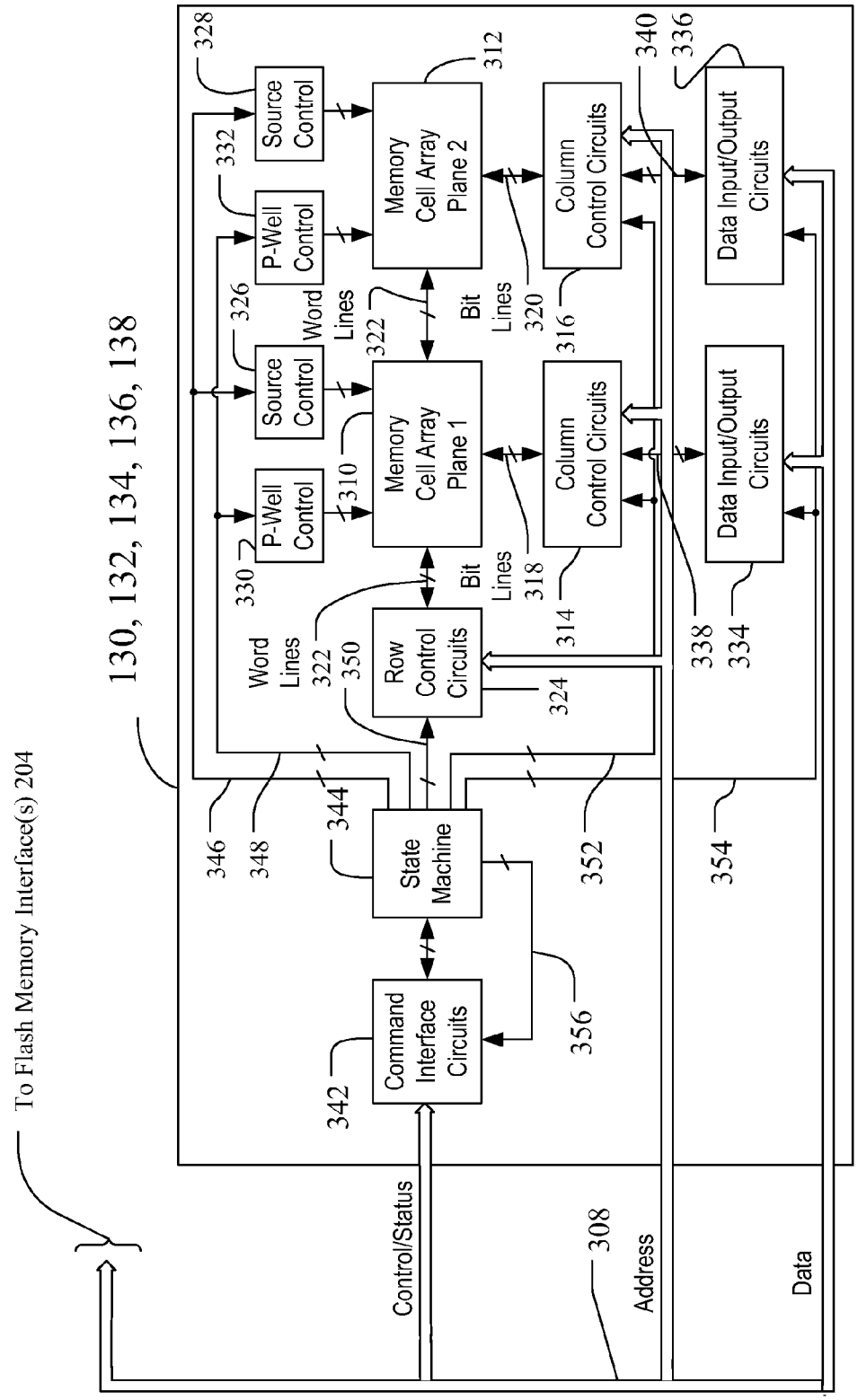
FIG. 3 is an example one flash memory bank suitable as one of the non-volatile memory banks illustrated in FIG. 1.

Each die 130, 132, 134, 136, 138 in the flash memory 116 may contain an array of memory cells organized into multiple planes. FIG. 3 shows planes 310 and 312 for simplicity but a lesser number, such as one plane or a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array, and decode them to address a specific one or more of respective bit lines 318 and 320. The word lines 322 are addressed through row control circuits 324 in response to addresses received on the bus 308. Source voltage control circuits 326 and 328 are also connected with the respective planes, as are p-well voltage control circuits 330 and 332. If the bank is in the form of a memory chip with a single array of memory cells, and if two or more such chips exist in the system, data are transferred into and out of the planes 310 and 312 through respective data input/output circuits 334 and 336 that are connected with the bus 308. The circuits 334 and 336 provide for both programming data into the memory cells and for reading data from the memory cells of their respective planes, through lines 338 and 340 connected to the planes through respective column control circuits 314 and 316.

Although the processor 206 in the system controller 118 controls the operation of the memory chips in each die 130, 132, 134, 136, 138 to program data, read data, erase and attend to various housekeeping matters, each memory chip also contains some controlling circuitry that executes commands from the controller 118 to perform such functions. Interface circuits 342 are connected to the bus 308. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus 308.

A NAND architecture of the memory cell arrays 310 and 312 is discussed below, although other architectures, such as NOR, can be used instead. An example NAND array is illustrated by the circuit diagram of FIG. 4, which is a portion of the memory cell array 310 of the memory bank of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
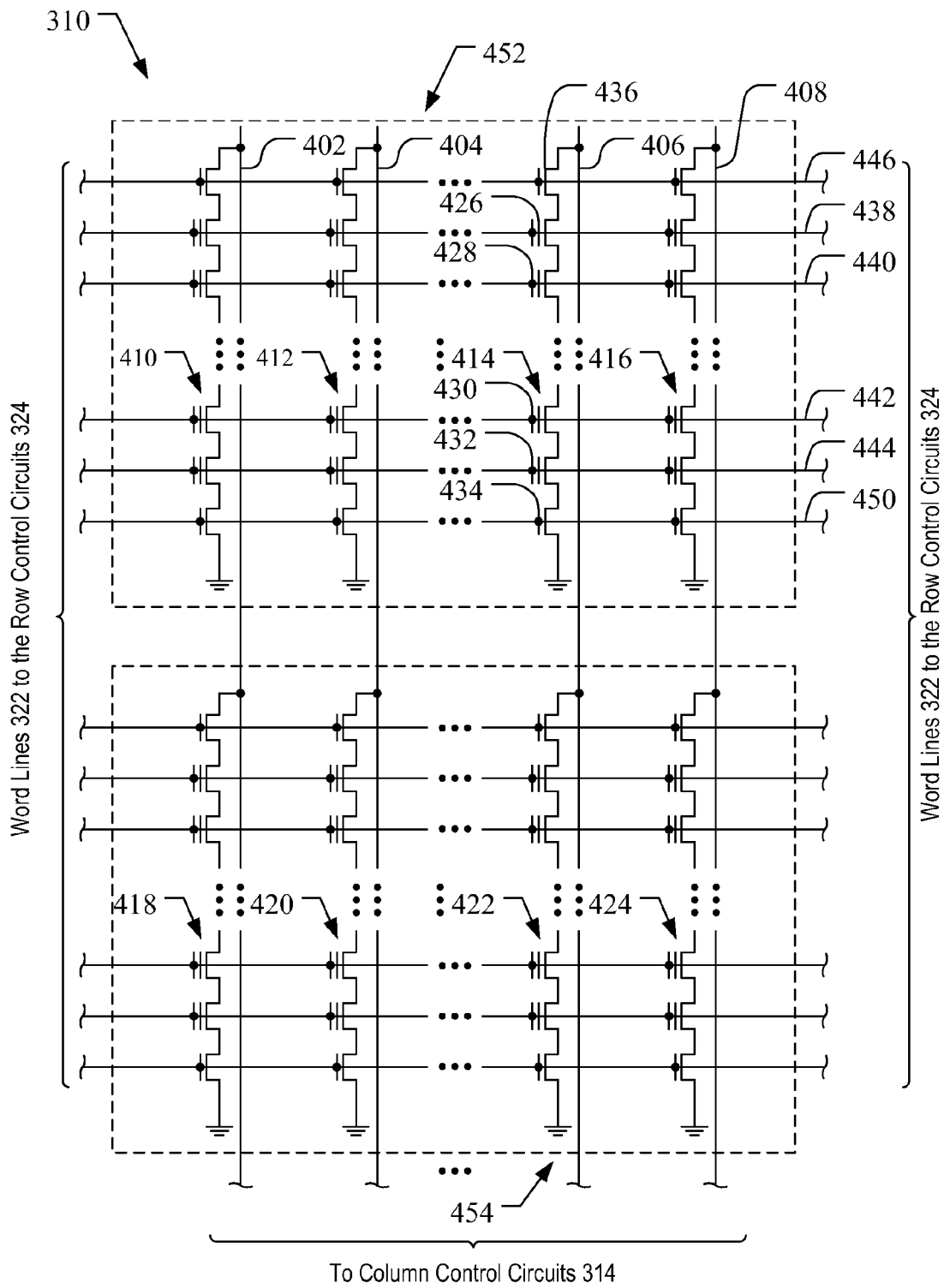
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. The row along the word line 438 is programmed last.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

The non-volatile flash memory may be arranged in blocks of memory cells. A block of memory cells is the unit of erase, i.e., the smallest number of memory cells that are physically erasable together. For increased parallelism, however, the blocks may be operated in larger metablock units. One block from each of at least two planes of memory cells may be logically linked together to form a metablock. The metablocks may be created from virtual metaplanes, virtual physical die, and virtual physical blocks, rather than the actual physical die and actual physical blocks. The physical die may include physical planes. Similarly, a virtual metaplane may be defined, which may comprise a plane across multiple virtual die in the virtual physical addressing space. The virtual physical addresses inside the virtual metaplanes may be translated to actual physical flash addresses at the lowest level of the firmware, as discussed above.

Certain operations of the system controller 118 may refer to virtual physical designations (such as virtual dies and virtual blocks) whereas other operations of the system controller 118 may refer to actual physical designations (such as physical dies and physical blocks). In performing the system operations, the system controller 118 may create various constructs in order to organize and refer to groups of virtual physical designations or groups of actual physical designations. For example, referring to FIG. 5, a conceptual illustration of a representative flash memory cell array of the virtual physical designations is shown, which takes advantage of a power-of-2 number of die. Four virtual planes or sub-arrays 502, 504, 506 and 508 memory cells may be on a single integrated memory cell chip, on two chips (two of the planes on each chip) or on four separate chips. The specific arrangement is not important to the discussion below and other numbers of virtual planes may exist in a system. Rather, FIG. 5 merely illustrates an organization of virtual physical designations.

Figure 5:
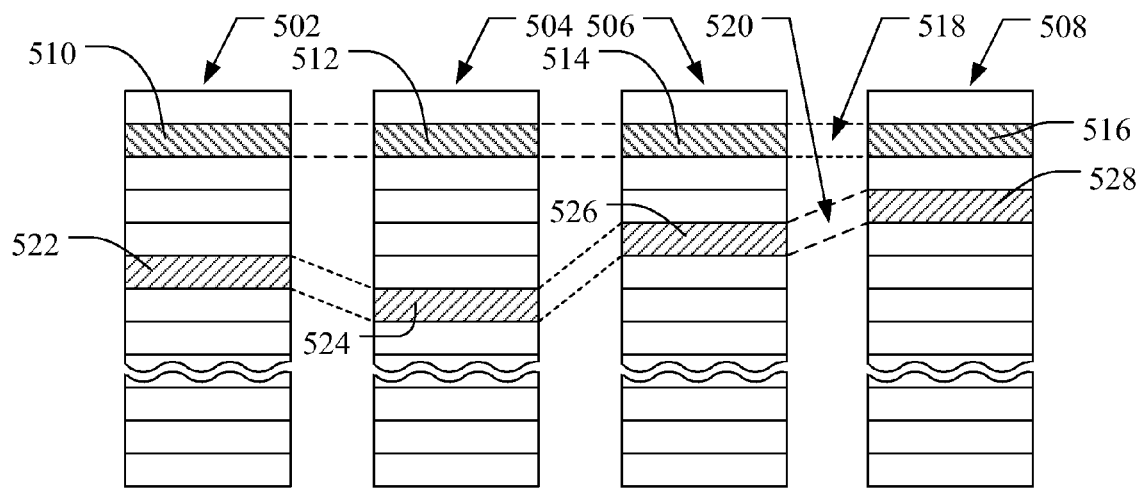
FIG. 5 illustrates an example physical memory organization of the memory bank of FIG. 3.

The virtual planes are individually divided into virtual blocks of memory cells shown in FIG. 5 by rectangles, such as virtual blocks 510, 512, 514 and 516, located in respective virtual planes 502, 504, 506 and 508. There may be dozens or hundreds of blocks in each plane. Blocks may be logically linked together to form a virtual metablock created from the virtual metaplanes, virtual die or virtual blocks that may be erased as a single unit. For example, virtual blocks 510, 512, 514 and 516 may form a first virtual metablock 518. The virtual blocks used to form a virtual metablock need not be restricted to the same relative locations within their respective virtual planes, as is shown in the second virtual metablock 520 made up of virtual blocks 522, 524, 526 and 528.

Figure 6:
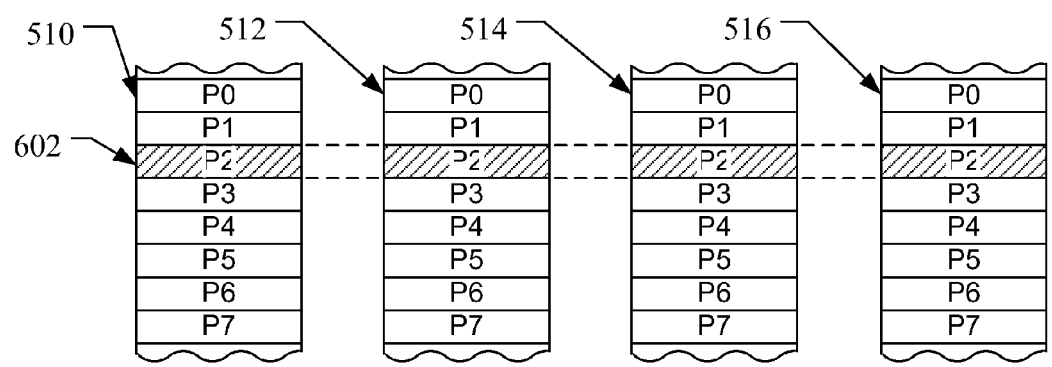
FIG. 6 shows an expanded view of a portion of the physical memory of FIG. 5.

The individual virtual blocks are in turn divided for operational purposes into pages of memory cells, as illustrated in FIG. 6. The memory cells of each of virtual blocks 510, 512, 514 and 516, for example, are each divided into eight pages P0-P7. Alternately, there may be 16, 32 or more pages of memory cells within each block. In one embodiment, a page is the unit of data programming within a block, containing the minimum amount of data that are programmed at one time. Alternatively, partial page programming may be performed, such as on SLC blocks. The minimum unit of data that can be read at one time may be less than a page. A virtual metapage 602 is illustrated in FIG. 6 as formed of one physical page for each of the four virtual blocks 510, 512, 514 and 516. The virtual metapage 602 includes the page P2 in each of the four blocks but the pages of a virtual metapage need not necessarily have the same relative position within each of the blocks. A virtual metapage is the maximum unit of programming. The virtual blocks disclosed in FIGS. 5-6 are referred to herein as virtual physical blocks because they relate to groups of virtual physical memory cells as discussed above. As used herein, a logical block is a virtual unit of logical address space defined to have the same size as a physical block (whether a virtual physical block or an actual physical block). The logical block may be mapped to one or both of the defined physical address spaces, such as the virtual physical address space and/or the actual physical address space. In one embodiment, the logical space (such as the logical group and/or metablock address) may be mapped to the virtual physical space using logical-to-virtual conversion logic 124, and the virtual physical space may be mapped to the actual physical space using the virtual-to-physical conversion logic 126.

Figure 7:
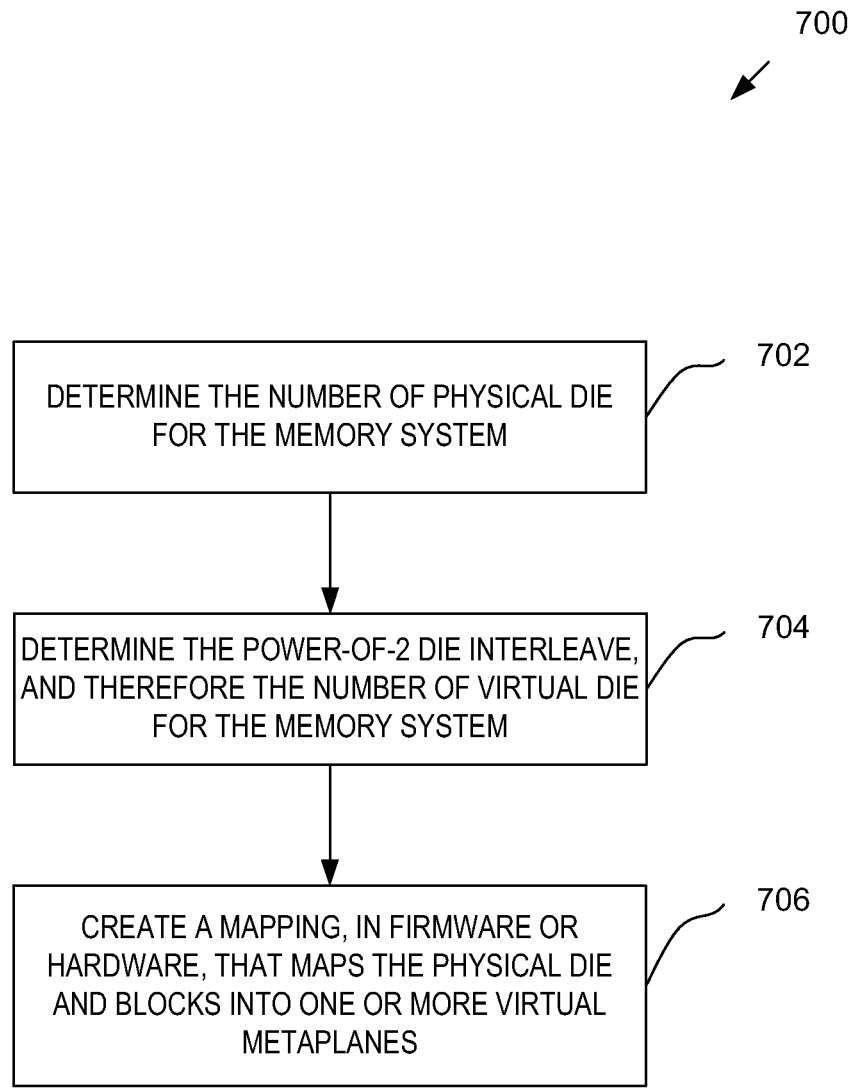
FIG. 7 is a flow diagram of a method for mapping the physical die to the virtual die.

FIG. 7 is a flow diagram 700 of a method for mapping the actual physical die to the virtual physical die. At 702, the number of actual physical die (and also potentially the number of blocks per actual physical die) for the memory system is determined. As discussed above, several factors may affect the determination as to the number of actual physical die (and also the number of blocks per physical die), such as end user storage capacity, mix of SLC and MLC blocks, mix of host and system blocks, the budget for bad blocks and spare blocks. In this way, the determined number of actual physical die may be based on the desired capacity of the memory system. So that, the number of actual physical die and the number of blocks per die determine how many blocks are on the memory system.

At 704, the power-of-2 die interleave is determined. In one embodiment, the die interleave does not exceed the number of physical die determined at 702. The die interleave for the virtual physical die (which in one embodiment is equal to the number of virtual physical die) conforms to a power-of-2 in number and also is less than the actual number of die determined at 702. For example, if the number of actual physical die determined at 702 is 5 die, the number of virtual die (and the die interleave) is less than 5 and is a power-of-2. So that, the number of virtual die may be 2 or 4 in number.

At 706, a mapping in firmware or hardware is created that maps the physical die and blocks into one or more virtual metaplanes. Each virtual metaplane may have the desired die interleave of virtual physical die. The virtual physical die within a virtual metaplane maps to the physical die in a way that supports die interleaving at the physical level. Mapping examples are discussed below in FIGS. 8A-B and 9A-D. The examples below use different numbers of physical die (5 die in FIGS. 8A-B and 3 die in FIGS. 9A-D), and use different die interleave (4 die interleave in FIGS. 8A-B and 2 die interleave in FIGS. 9A-D). The examples further use 1 plane per die; however, multiplane die may be used as well.

One or more guidelines may be used for mapping the physical configuration (such as the physical blocks) to the virtual configuration (such as the virtual blocks). One guideline is to maintain parallelism when constructing the virtual configuration. As discussed above, the die interleave does not exceed the number of physical die determined. This enables the virtual configuration to maintain parallelism. For example, the virtual die regions that make up the horizontal linking within a virtual metablock may come from different physical die so that die interleaving may be supported at the physical level. As discussed above, a metablock is a construct where different blocks are grouped together as a shorthand way to address a conglomeration of the different blocks. In one embodiment, physical blocks from different physical dies are selected for the virtual metablock since, on a physical level, the different dies may be accessed in parallel. Otherwise, if physical blocks from the same die are selected for the virtual metablock, all of the blocks cannot be read in parallel.

Another guideline may be to map based on operational requirements. For example, some memory systems examine a particular block (such as examining physical die 0, physical block 0) for its initial boot information. To maintain boot up compatibility with existing ROMs, the die regions in the first horizontal linking may be from the first die region of the first physical die. Again, this guideline is optional and may vary from one memory system to another.

Still another guideline is mapping to maintain the fitness of the flash memory. For example, to maintain the health of the NANDs, the SLC and MLC blocks should be grouped into 2 contiguous regions. By mapping the die regions within a die in order, the order of SLC and MLC blocks that the MML (memory management layer) allocates on the virtual die may be maintained on the physical die. At the silicon level, it may be beneficial to group the SLC blocks together, such as on one portion of the die (e.g., blocks 0 to N) and to group MLC blocks together, such as on the remaining portion of the die (e.g., blocks N+1 to end of die). More specifically, mapping of the virtual blocks may maintain groups of SLC blocks and groups of MLC blocks. In this way, the mapping of the virtual blocks does not mix (or does not unduly mix) SLC blocks with MLC blocks.

Mapping of the physical configuration to the virtual configuration may be performed in one of several ways. One way is to divide each actual physical die into a number of die regions equal to the die interleave number. The die regions are then mapped into the virtual physical die. FIGS. 8A-B provide one example of this. For simplicity, FIGS. 8A-B depict the die as containing 1 plane. However, more than one plane may be used. In this regard, this mapping method may be applied to other combinations of physical die, planes per die and die interleave.

FIG. 8A illustrates the depiction of the physical space, with the mapping of sequential die regions. More specifically, FIG. 8A illustrates 5 die, such as die 130, 132, 134, 136, 138 depicted in FIG. 1. Each die may include multiple physical die regions, such as physical die regions 0, 1, 2, and 3, and associated physical block numbers for each of the physical die regions, such as physical block numbers 0-249, 250-499, 500-749, and 750-999. So that, there are 5000 blocks spread across the five die 130, 132, 134, 136, 138.

FIG. 8B illustrates one depiction of the virtual space, with the mapping of sequential die regions. More specifically, FIG. 8B illustrates 4 die, which is a power-of-2. As discussed above, different numbers of virtual die that are a power-of-2 may be selected. In one embodiment, in order to support parallel operations on the actual physical die, the number of virtual die is selected to be less than the number of the actual physical die. In the example of FIGS. 8A-B, the number of virtual die may be 2 or 4. More specifically, the number of virtual die may be equal to the die interleave (so that 4 physical die may act simultaneously to perform the same function or may act to perform one or more different functions).

Each virtual die may include multiple virtual die regions, such as virtual die regions 0, 1, 2, 3, and 4, and associated virtual block numbers for each of the virtual die regions, such as virtual block numbers 0-249, 250-499, 500-749, 750-999, and 1000-1249. In this way, the 5 actual physical die with 1000 blocks each (for 5000 physical blocks total) depicted in FIG. 8A may be mapped to 4 virtual physical die with 1250 blocks each (for 5000 virtual blocks total) depicted in FIG. 8B.

As shown in FIG. 8B, virtual die 0 has virtual block numbers 0-1249, with the first 250 blocks from physical die 0 and physical die region 0, the second 250 blocks from physical die 4 and physical die region 0, the third 250 blocks from physical die 3 and physical die region 1, the fourth 250 blocks from physical die 2 and physical die region 2, and the fifth 250 blocks from physical die 1 and physical die region 3. Further, as shown, the physical blocks that would make up a metablock that was horizontally linked in the virtual physical space would be from different physical die, so that die interleaving may still be achieved. Moreover, the mapping as depicted in FIG. 8B is merely one illustrative example. There may be 2 virtual die with 2,500 virtual blocks, or 8 virtual die with 625 virtual blocks. As discussed above, in order to perform die interleaving in the example of FIGS. 8A-B, 2 or 4 virtual physical die are chosen.

Figure 9A:
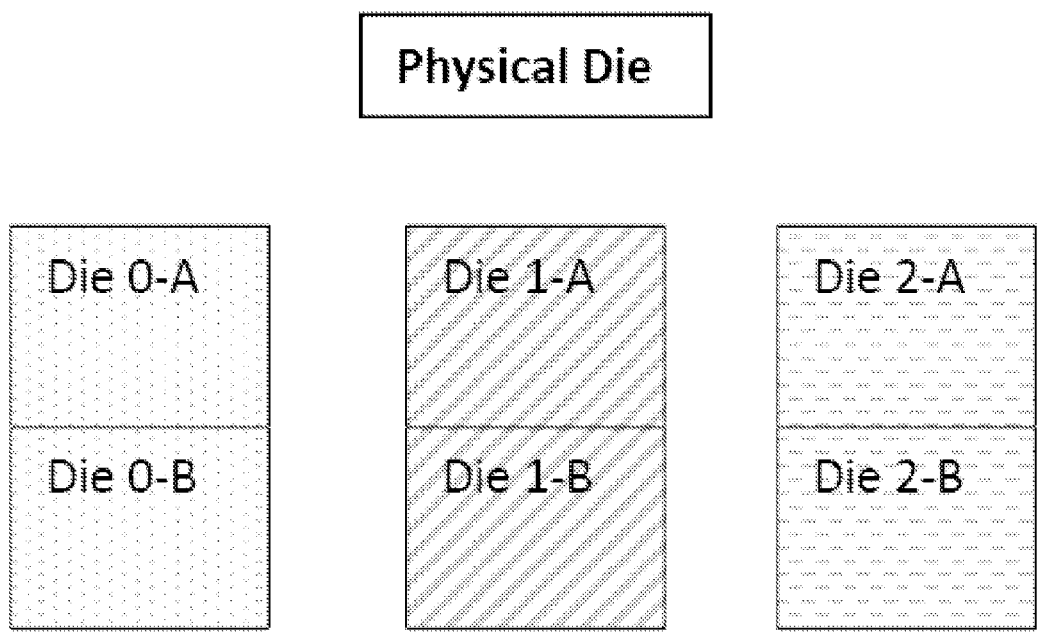

FIGS. 9A-D illustrates other examples of the mapping of sequential die regions in the physical space and in the virtual space. FIG. 9A shows the layout of the physical die with three die, die 0, die 1 and die 2, with two regions per die.

Figure 9B:
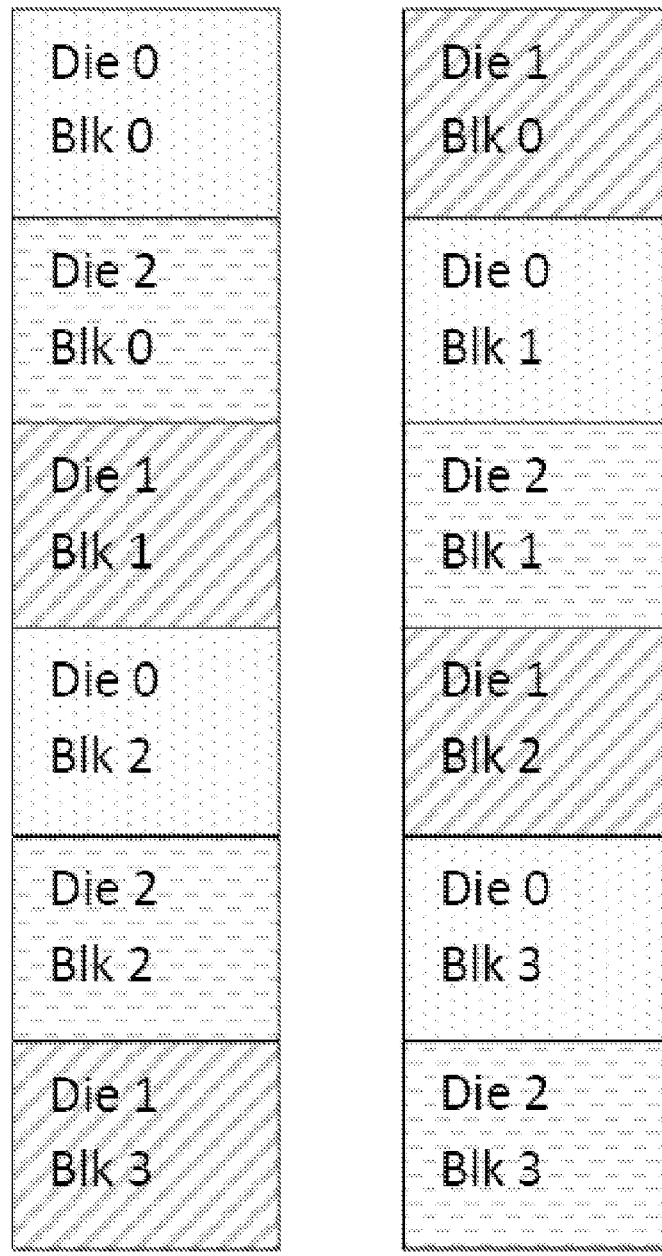

FIG. 9B illustrates one type of mapping in that the virtual blocks are mapped to the physical blocks with a simple linear mapping. First, physical block 0 from each die is mapped to virtual blocks. Then, physical block 1 from each die is mapped. This repeats until the last physical block is mapped. The two resulting virtual die each have 50% more blocks than the 3 physical die. Further, as shown, metaplane 0 maintains die interleave.

FIG. 9C illustrates another type of mapping in that each physical die is subdivided into the die interleave number of regions. The sub-regions are then mapped to two enlarged virtual die. In some embodiments, mapping the blocks as sub-regions rather than individual blocks as depicted in FIG. 9B may be beneficial.

FIG. 9D illustrates still another type of mapping in that each physical die is again divided into the die interleave number of regions. In this example, the sub-regions are mapped into several independent metaplanes. A benefit of this configuration is that relinking within a metaplane may avoid the possibility of creating a relinked metablock that contains blocks from the same physical die.

Figure 10:
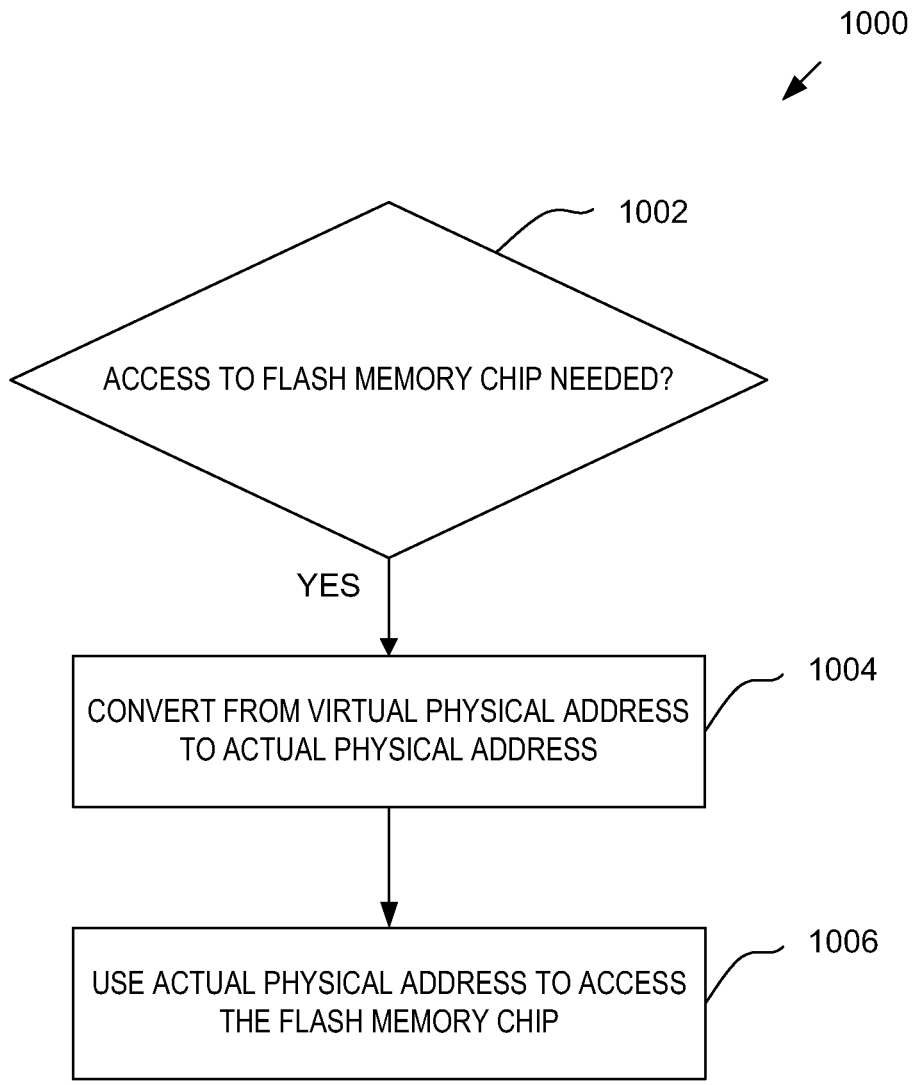
FIG. 10 is a flow diagram of a method for converting from a virtual physical address and an actual physical address.

FIG. 10 is a flow diagram 1000 of a method for converting from a virtual physical address to an actual physical address. At 1002, it is determined whether an access to the flash memory chip is needed. If so, at 1004, a conversion is made from the virtual physical address to the actual physical address. As discussed above, the conversion may be made with one or more types of mapping schemes. At 1006, the actual physical address is used to access the flash memory chip.

Figure 11:
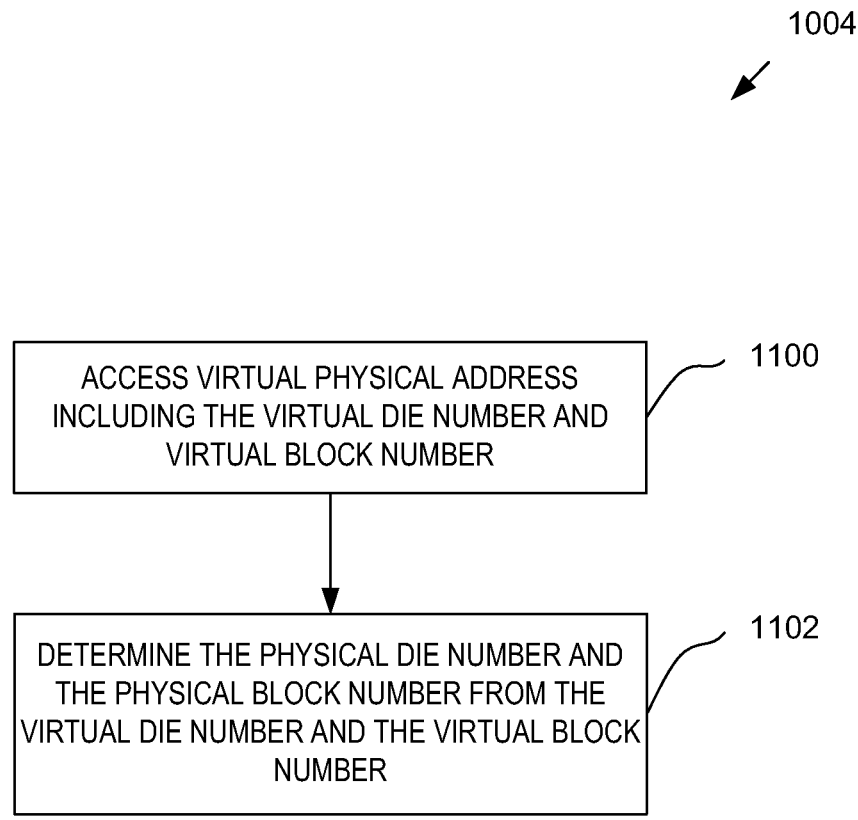
FIG. 11 is a flow diagram of an expansion of the conversion of FIG. 10.

FIG. 11 is a flow diagram of an expansion of the conversion 1004 of FIG. 10. At 1100, the virtual physical address, including the virtual die number and the virtual block number, is accessed. At 1102, the physical die number and the physical block number are determined from the virtual die number and the virtual block number.

There are various ways to convert between actual physical and virtual physical addresses. The following is one example. The inputs to the conversion may include the die number and the block number, such as the actual physical die number (die(p)), the virtual physical die number (die(v)), the actual physical block number within a plane (block(p)) and the virtual physical block number within a plane (block(v)).

Further, there are certain parameters that may be known at format time, such as:

numDie(p)=number of actual physical die (e.g., FIG. 8A includes 5 actual physical die)

numBlocks(p)=number of actual physical blocks per die numDieRgn(p)=number of physical die regions (e.g., FIG. 8A includes 4 physical die regions, including physical die regions 0, 1, 2, 3).

numDie(v)=number of virtual die.

In one embodiment, the number of physical die regions equals the number of virtual die, which is also equal to the desired die interleave. In the example in FIG. 8A, there are 4 physical die regions and 4 virtual die.

numBlocks(v)=number of virtual blocks per die. As discussed above, this example assumes 1 plane per die for simplicity. Alternatively, the equations discussed herein may be expanded to support multi-plane environments.

$$=numDie(p)*numBlocks(p)/numDie(v)$$

As illustrated in FIG. 8A, the total number of physical blocks equals 5,000 (5 die*1000 blocks/die). So that, the number of virtual blocks per die is 1,250.

$$numDieRgn(v)=\text{number of virtual die regions.}$$

In one embodiment, the number of virtual die regions is equal to the number of actual physical die. As illustrated in FIG. 8A, the number of actual physical die is 5 and the number of virtual die regions is 5 as well (virtual die regions 0, 1, 2, 3, and 4).

$$numBlocksPerDieRgn = \text{number of blocks per die region}$$
$$= numBlocks(p)/numDieRgn(p)$$
$$= numBlocks(v)/numDieRgn(v)$$

The number of blocks per die region either in the actual physical configuration or in the virtual physical configuration is determined by dividing the total number of blocks by the number of die regions. For example, in FIG. 8A, the number of blocks per die region is 250.

The following is an example of a conversion from the virtual physical configuration to the actual physical configuration. In one embodiment, the addressing uses the die number and the block number. So that, the input to the conversion is the virtual physical die number and the virtual physical block number. And, the output to the conversion is the actual physical die number and the actual physical block number. The equations below use integer math, so that division that does not result in an integer is rounded down.

$$dieRgn(v) = \text{virtual die region}$$
$$= block(v)/numBlocksDieRgn$$

The virtual die regions (such as virtual die region 0, 1, 2, 3 or 4) may be calculated by using the virtual block number divided by the number of blocks per die region.

$$seqDieRgn(v) = \text{virtual sequential die region}$$
$$= dieRgn(v) * numDie(v) + die(v)$$
$$seqDieRgn(p) = \text{physical sequential die region}$$
$$= seqDieRgn(v)$$
$$die(p) = seqDieRegion(p) \text{ Mod } numDie(p)$$
$$dieRgn(p) = \text{physical die region}$$
$$= seqDieRegion(p)/numDie(p)$$
$$block(p) = (dieRgn(p) * numBlocksPerDieRgn) +$$
$$(block(v) - dieRgn(v) * numBlocksPerDieRgn)$$

Figure 12:
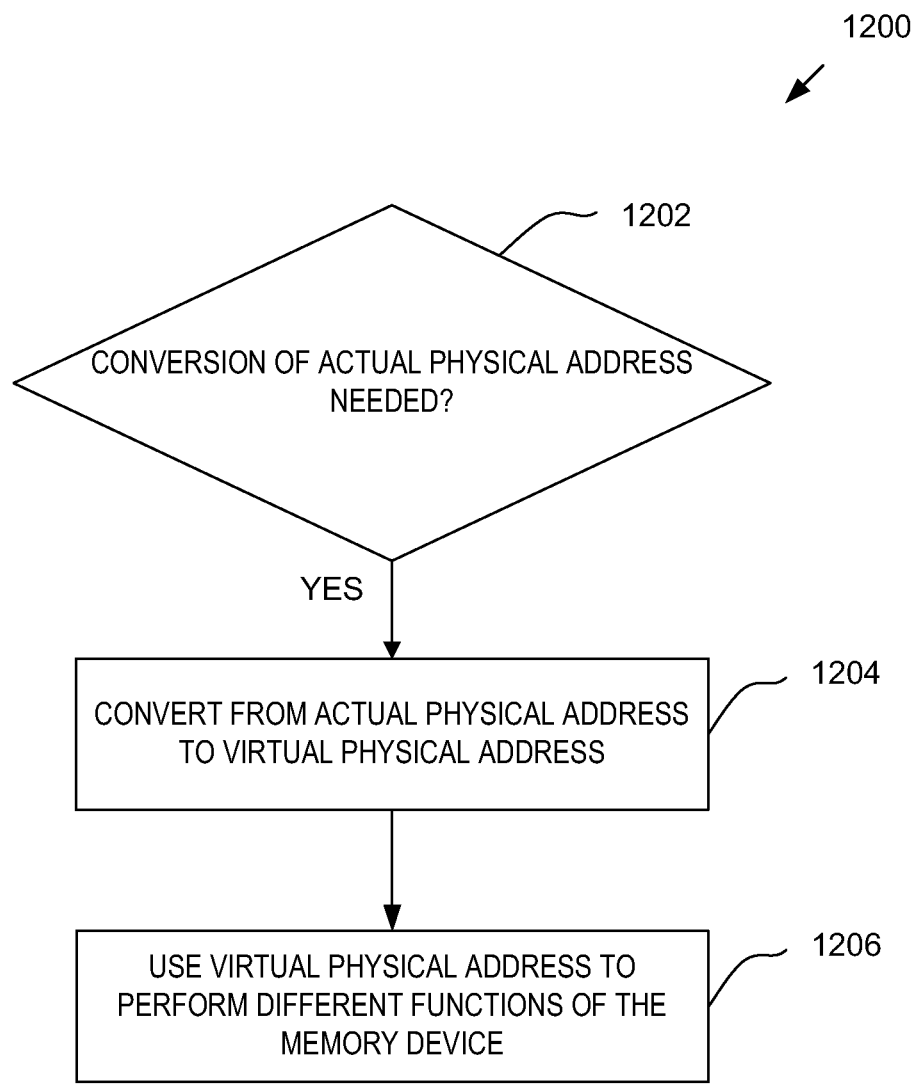
FIG. 12 is a flow diagram of a method for converting from an actual physical address to a virtual physical address.

FIG. 12 is a flow diagram 1200 of a method for converting from an actual physical address to a virtual physical address. At 1202, it is determined whether a conversion of an actual physical address is needed. If so, at 1204, a conversion is made from the actual physical address to the virtual physical address. As discussed above, the conversion may be made with one or more types of mapping schemes. At 1206, the virtual physical address is used to perform different functions of the memory device.

The following is an example of the equations used for conversion from the actual physical configuration to the virtual physical configuration. In one embodiment, the addressing uses the die number and the block number. So that, the input to the conversion is the actual physical die number and the actual physical block number. And, the output to the conversion is the virtual physical die number and the virtual physical block number.

$$dieRgn(p) = \text{Physical die region}$$
$$= block(p)/numBlocksPerDieRgn$$
$$seqDieRgn(p) = \text{Physical sequential die region}$$
$$= dieRgn(p) * numDie(p) + die(p)$$
$$seqDieRgn(v) = \text{Virtual sequential die region}$$
$$= seqDieRgn(p)$$
$$die(v) = seqDieRegion(v) \text{ Mod } numDie(v)$$
$$dieRgn(v) = \text{Virtual die region}$$
$$= seqDieRegion(v)/numDie(v)$$
$$block(v) = (dieRgn(v) * numBlocksPerDieRgn) +$$
$$(block(p) - dieRgn(p) * numBlocksPerDieRgn)$$

Accordingly, the method and system may be realized in hardware, software, or a combination of hardware and software. The method and system may be realized in a centralized fashion in at least one electronic device (such as illustrated in flash memory device 102 in FIG. 1) or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be implemented using a computer-readable media. For example, logical-to-virtual conversion logic 124 and virtual-to-physical conversion logic 126 may be implemented using computer-readable media to implement the functionality described herein, such as discussed in FIGS. 7 and 10-12. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. The computer-readable medium can be a single medium or multiple media. Accordingly, the disclosure may be considered to include any one or more of a computer-readable medium or a distribution medium and other equivalents and successor media, in which data or instructions can be stored. For example, the processor 210 may access instructions stored in memory, such as RAM 212, in order to provide the functionality herein. As another example, the flash memory interface(s) may be configured to implement the functionality described herein. In either example, the system controller 118 may include a device that is configured to perform the functionality described herein.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

What is claimed is:

1. A method of operating a non-volatile memory system comprising:
   receiving a logical address from a host device;
   converting between the logical address and a virtual physical address, wherein the virtual physical address comprises a virtual die, a number of the virtual die being two or greater; and
   converting between the virtual physical address and an actual physical address, wherein the actual physical address comprises an actual die,
   wherein the number of virtual die is different from a number of actual die,
   wherein a number of virtual blocks per virtual die is different than a number of actual blocks per actual die,
   wherein converting between the virtual physical address and the actual physical address comprises using a mapping of actual blocks in the actual die with virtual blocks in the virtual die, and
   wherein a total number of the actual blocks mapped is equal to a total number of the virtual blocks being mapped.

2. The method of claim 1, wherein the logical address comprises a range of logical block addresses.

3. The method of claim 2, wherein converting between the logical address and the virtual physical address comprises:
   converting between the range of logical block addresses and internal logical addresses; and
   converting between the internal logical addresses and the virtual physical addresses.

4. The method of claim 2, wherein converting between the logical address and the virtual physical address comprises converting directly between the range of logical block addresses and the virtual physical addresses.

5. The method of claim 1, wherein the number of the virtual die are a power-of-2; and
   wherein the number of the actual die are not a power-of-2.

6. The method of claim 5, wherein the virtual physical addresses comprise the virtual blocks; and
   wherein the actual physical addresses comprise the actual blocks.

7. The method of claim 6, wherein the number of the virtual die is less than the number of the actual die;
   wherein the number of the virtual blocks per virtual die is greater than the number of the actual blocks per actual die;
   wherein a total number of actual blocks equals the number of actual die multiplied by the number of actual blocks per actual die;
   wherein a total number of virtual blocks equals the number of virtual die multiplied by the number of virtual blocks per virtual die; and
   wherein the total number of actual blocks equals the total number of virtual blocks.

8. The method of claim 1, further comprising:
   performing a first set of operations using the virtual physical addresses; and
   performing a second set of operations using the actual physical addresses,
   wherein the first set of operations is different from the second set of operations.

9. The method of claim 8, wherein the non-volatile memory system comprises a plurality of memory cells; and
   wherein the second set of operations comprise operations on the memory cells.

10. The method of claim 9, wherein the second set of operations comprise commanding to read a particular address, commanding to write to the particular address and commanding to erase a particular block.

11. The method of claim 1,
    wherein a total number of actual blocks equals a number of actual die multiplied by the number of actual blocks per actual die;
    wherein a total number of virtual blocks equals a number of virtual die multiplied by the number of virtual blocks per virtual die; and
    wherein the total number of actual blocks equals the total number of virtual blocks.

12. A non-volatile memory system comprising:
    an interface configured to receive a logical address from a host device;
    a non-volatile memory; and
    a controller in communication with the memory and the interface, the controller configured to:
      convert between the logical address and a virtual physical address, wherein the virtual physical address comprises a virtual die, a number of the virtual die being two or greater; and
      convert between the virtual physical address and an actual physical address, wherein the actual physical address comprises an actual die
      wherein the number of virtual die is different from a number of actual die,
      wherein a number of virtual blocks per virtual die is different than a number of actual blocks per actual die,
      wherein the controller is configured to convert between the virtual physical address and the actual physical address by using a mapping of actual blocks in the actual die with virtual blocks in the virtual die, and
      wherein a total number of the actual blocks mapped is equal to a total number of the virtual blocks being mapped.

13. The non-volatile memory system of claim 12, wherein the logical address comprises a range of logical block addresses.

14. The non-volatile memory system of claim 13, wherein the controller is configured to convert between the logical address and the virtual physical address by:
    converting between the range of logical block addresses and internal logical addresses; and
    converting between the internal logical addresses and the virtual physical addresses.

15. The non-volatile memory system of claim 13, wherein the controller is configured to convert between the logical address and the virtual physical address by converting directly between the range of logical block addresses and the virtual physical addresses.

16. The non-volatile memory system of claim 12, wherein the number of the virtual die are a power-of-2; and
    wherein the number of the actual die are not a power-of-2.

17. The non-volatile memory system of claim 16, wherein the virtual physical addresses comprise the virtual blocks; and
    wherein the actual physical addresses comprise the actual blocks.

18. The non-volatile memory system of claim 17, wherein the number of the virtual die is less than the number of the actual die;
    wherein the number of the virtual blocks per virtual die is greater than the number of the actual blocks per actual die;

wherein a total number of actual blocks equals the number of actual die multiplied by the number of actual blocks per actual die;

wherein a total number of virtual blocks equals the number of virtual die multiplied by the number of virtual blocks per virtual die; and wherein the total number of actual blocks equals the total number of virtual blocks.

19. The non-volatile memory system of claim 12, wherein the controller is further configured to:

perform a first set of operations using the virtual physical addresses; and perform a second set of operations using the actual physical addresses, wherein the first set of operations is different from the second set of operations.

20. The non-volatile memory system of claim 19, wherein the non-volatile memory system comprises a plurality of memory cells; and wherein the second set of operations comprise operations on the memory cells.

21. The non-volatile memory system of claim 20, wherein the second set of operations comprise commanding to read a particular address, commanding to write to the particular address and commanding to erase a particular block.

22. A method for configuring virtual physical addressing in a non-volatile memory system comprising:

determining an actual physical configuration for the memory system comprising a number of actual die, the number of actual die being other than a power-of-2;

determining a virtual physical configuration for the memory system comprising a number of virtual die, the number of virtual die being a power-of-2; and mapping the actual physical configuration with the virtual physical configuration, wherein the actual physical configuration comprises a total number of actual blocks, the total number of actual blocks equaling the number of actual die multiplied by a number of actual blocks per actual die;

wherein the virtual physical configuration comprises a total number of virtual blocks, the total number of virtual blocks equaling the number of virtual die multiplied by a number of virtual blocks per virtual die; and wherein the total number of actual blocks equals the total number of virtual blocks.

23. The method of claim 22, wherein the number of virtual die is less than the number of actual die.

24. The method of claim 22, wherein mapping comprises mapping the actual physical die and actual physical blocks into one or more virtual metaplanes.

* * * * *